United States Patent
Ohmura (10) Patent No.: US 11,699,540 B2
(45) Date of Patent: Jul. 11, 2023

(54) FERRITE SINTERED MAGNET, FERRITE PARTICLES, BONDED MAGNET, AND ROTATING ELECTRICAL MACHINE

(71) Applicant: TDK Corporation, Tokyo (JP)

(72) Inventor: Masashi Ohmura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/700,954

(22) Filed: Mar. 22, 2022

(65) Prior Publication Data

US 2022/0319746 A1   Oct. 6, 2022

(30) Foreign Application Priority Data

Mar. 24, 2021   (JP) .............................. JP2021-050270

(51) Int. Cl.
| | | |
|---|---|---|
| *H01F 1/113* | (2006.01) | |
| *C01G 51/00* | (2006.01) | |
| *C08K 3/22* | (2006.01) | |

(52) U.S. Cl.
CPC ............ *H01F 1/113* (2013.01); *C01G 51/70* (2013.01); *C08K 3/22* (2013.01); *C01P 2002/30* (2013.01); *C01P 2002/52* (2013.01); *C01P 2006/42* (2013.01); *C08K 2003/2289* (2013.01); *C08K 2201/01* (2013.01)

(58) Field of Classification Search
None
See application file for complete search history.

(56) References Cited

U.S. PATENT DOCUMENTS

| | | | | |
|---|---|---|---|---|
| 5,055,322 A | * | 10/1991 | Yamamoto ......... | G11B 5/70678 427/128 |
| 5,605,753 A | * | 2/1997 | Sanada ................. | H01F 1/11 428/335 |
| 5,846,449 A | | 12/1998 | Taguchi et al. | |
| 6,086,781 A | * | 7/2000 | Taguchi ................. | H01F 1/112 252/62.63 |

(Continued)

FOREIGN PATENT DOCUMENTS

| | | | | |
|---|---|---|---|---|
| EP | | 758786 A1 * | 2/1997 | ......... C04B 35/2633 |
| JP | | H09-115715 A | 5/1997 | |
| WO | | WO-2018/117261 A1 | 6/2018 | |

OTHER PUBLICATIONS

IN Office Action dated Oct. 20, 2022 in Indian Patent Application No. 202244016081.

*Primary Examiner* — Kevin M Bernatz (74) *Attorney, Agent, or Firm* — Faeqre Drinker Biddle & Reath LLP (57) ABSTRACT

The magnet is a ferrite sintered magnet containing a ferrite phase having a magnetoplumbite-type crystal structure. The ferrite sintered magnet contains at least Ca, a metal element A, a metal element R, Bi, Fe, and a metal element M. The metal element A is at least one kind of element selected from the group consisting of Sr, Ba, and Pb, the metal element R is at least one kind of element selected from the group consisting of rare-earth elements including Y and essentially includes La, the metal element M is at least one kind of element selected from the group consisting of Co, Ni, Zn, Al, Cu, and Cr, and essentially includes Co, and when an atonic ratio of the metal elements is expressed by Formula (1), c, a, r, b, f, and m in Formula (1) satisfy the following Expressions (2) to (8).

7 Claims, 2 Drawing Sheets

(56) References Cited

U.S. PATENT DOCUMENTS

| | | | | |
|---|---|---|---|---|
| 6,139,766 | A * | 10/2000 | Taguchi | C04B 35/63 |
| | | | | 310/46 |
| 6,402,980 | B1 * | 6/2002 | Taguchi | H01F 1/10 |
| | | | | 252/62.63 |
| 6,773,620 | B2 * | 8/2004 | Umemoto | C04B 35/2633 |
| | | | | 428/689 |
| 7,964,072 | B2 * | 6/2011 | Wang | C04B 35/2641 |
| | | | | 205/781 |
| 2019/0252100 | A1 * | 8/2019 | Kim | C04B 35/62655 |
| 2019/0318856 | A1 | 10/2019 | Nagaoka et al. | |

* cited by examiner

FERRITE SINTERED MAGNET, FERRITE PARTICLES, BONDED MAGNET, AND ROTATING ELECTRICAL MACHINE

TECHNICAL FIELD

The present disclosure relates to a ferrite sintered magnet, ferrite particles, a bonded magnet, and a rotating electrical machine.

BACKGROUND

As a magnetic material that is used for a ferrite sintered magnet, Ba ferrite, Sr ferrite, and Ca ferrite which have a hexagonal crystal structure are known. As a crystal structure of these kinds of ferrite, a magnetoplumbite-type (M-type) is known. The M-type ferrite is typically expressed by a general formula of $AFe_{12}O_{19}$.

As the M-type ferrite, Japanese Unexamined Patent Publication No. H9-115715 discloses a magnet powder having a main phase of the M-type ferrite in which Fe is substituted with an element M such as Zn and an element A such as Sr and Ba is substituted with an element R such as La.

By the way, the magnetoplumbite-type (M-type) ferrite is used as a magnet material for a motor or the like, and a small size and high torque are required for the motor. Accordingly, a ferrite sintered magnet is required to have higher magnetic properties.

As an index of the magnetic properties of the ferrite sintered magnet, a residual magnetic flux density (Br) and squareness (Hk/HcJ) are used. The magnet powder disclosed in Japanese Unexamined Patent Publication No. H9-115715 has a room for improvement in Br and squareness.

SUMMARY

An object of an aspect of the invention is to provide a ferrite sintered magnet and the like excellent in Br and squareness.

According to an aspect of the invention, there is provided a ferrite sintered magnet containing a ferrite phase having a magnetoplumbite-type crystal structure. The sintered magnet contains at least Ca, a metal element A, a metal element R, Bi, Fe, and a metal element M. The metal element A is at least one kind of element selected from the group consisting of Sr, Ba, and Pb, the metal element R is at least one kind of element selected from the group consisting of rare-earth elements including Y and essentially includes La, the metal element M is at least one kind of element selected from the group consisting of Co, Ni, Zn, Al, Cu, and Cr, and essentially includes Co, and when an atomic ratio of the metal elements is expressed by Formula (1), c, a, r, b, f, and m in Formula (1) satisfy the following Expressions (2) to (8).

$$Ca_c A_a R_r Bi_b Fe_f M_m \quad (1)$$

$$0.15 \le c < 0.5 \quad (2)$$

$$0.01 \le a \le 0.1 \quad (3)$$

$$0.45 < r \le 0.80 \quad (4)$$

$$0.01 \le b < 0.1 \quad (5)$$

$$9.35 < f < 11.90 \quad (6)$$

$$0.1 \le m \le 0.50 \quad (7)$$

$$c + a + r + b = 1 \quad (8)$$

In the aspect, the ferrite sintered magnet may further satisfy the following Expressions (3-1), (5-1), (6-1), and (7-1).

$$0.03 \le a \le 0.05 \quad (3\text{-}1)$$

$$0.01 \le b \le 0.05 \quad (5\text{-}1)$$

$$9.35 < f \le 11.25 \quad (6\text{-}1)$$

$$0.25 \le m \le 0.45 \quad (7\text{-}1)$$

According to another aspect of the invention, there is provided a rotating electrical machine including the ferrite sintered magnet.

According to still another aspect of the invention, there is provided ferrite particles containing a ferrite phase having a magnetoplumbite-type crystal structure. The ferrite particles contain at least Ca, a metal element A, a metal element R, Bi, Fe, and a metal element M. The metal element A is at least one kind of element selected from the group consisting of Sr, Ba, and Pb, the metal element R is at least one kind of element selected from the group consisting of rare-earth elements including Y and essentially includes La, the metal element M is at least one kind of element selected from the group consisting of Co, Ni, Zn, Al, Cu, and Cr, and essentially includes Co, and when an atomic ratio of the metal elements is expressed by Formula (1), c, a, r, b, f, and m in Formula (1) satisfy the following Expressions (2) to (8).

$$Ca_c A_a R_r Bi_b Fe_f M_m \quad (1)$$

$$0.15 \le c < 0.5 \quad (2)$$

$$0.01 \le a \le 0.1 \quad (3)$$

$$0.45 < r \le 0.80 \quad (4)$$

$$0.01 \le b < 0.1 \quad (5)$$

$$9.35 < f < 11.90 \quad (6)$$

$$0.1 \le m \le 0.50 \quad (7)$$

$$c + a + r + b = 1 \quad (8)$$

According to still another aspect of the invention, there is provided a bonded magnet containing the ferrite particles and a resin.

According to still another aspect of the invention, there is provided a rotating electrical machine including the bonded magnet.

According to the aspect of the invention, a ferrite sintered magnet and the like excellent in Br and squareness are provided.

DETAILED DESCRIPTION

Hereinafter, an embodiment of the invention will be described. However, the invention is not limited to the following embodiment.

(Ferrite Sintered Magnet and Ferrite Particles)

Description will be given of a ferrite sintered magnet and ferrite particles according to the embodiment.

The ferrite sintered magnet and the ferrite particles according to the embodiment contain a ferrite phase having a magnetoplumbite-type crystal structure.

The ferrite sintered magnet and the ferrite particles according to the embodiment contain at least Ca, a metal element A, a metal element R, Bi, Fe, and a metal element M.

The metal element A is at least one kind of element selected from the group consisting of Sr, Ba, and Pb.

From the viewpoint of further improving Br and squareness, an atomic ratio of Ba in the metal element A can be 50 atomic % or more, 70 atomic % or more, 90 atomic % or more, 95 atomic % or more, 97% atomic % or more, or 99 atomic % or more, or may be 100 atomic %. There is no particular limitation to a ratio of atoms other than Ba in the metal element A.

From the viewpoint of further improving Br and squareness, the atomic ratio of Sr in the metal element A can be 50 atomic % or more, 70 atomic % or more, 90 atomic % or more, 95 atomic % or more, 97% atomic % or more, 99 atomic % or more, or may be 100 atomic %. There is no particular limitation to a ratio of atoms other than Sr in the metal element A.

The metal element R is at least one element selected from the group consisting of rare-earth elements including Y, and essentially includes La.

The rare-earth elements are yttrium (Y), scandium (Sc), lanthanum (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), and lutetium (Lu).

In the metal element R, La can be included in an amount of 50 atomic % or more, 95 atomic % or more, or 99 atomic % or more, or may be 100 atomic %.

The metal element M is at least one kind of element selected from the group consisting of Co, Ni, Zn, Al, Cu, and Cr, and essentially includes Co.

In the metal element M, Co can be included in an amount of 50 atomic % or more, 95 atomic % or more, or 99 atomic % or more, or may be 100 atomic %.

In a case where the metal element M includes Al, in the metal element M, Al can be included in an amount of 1 atomic % or more or 5 atomic % or more, and 13 atomic % or less or 10 atomic % or less.

In a case where the metal element M includes Ni, in the metal element M, Ni can be included in an amount of 1 atomic % or more or 5 atomic % or more, and 13 atomic % or less.

In a case where the metal element M includes Zn, in the metal element M, Zn can be included in an amount of 1 atomic % or more or 5 atomic % or more, and 13 atomic % or less.

In a case the metal element M includes Cu, in the metal element M, Cu can be included in an amount of 1 atomic % or more or 5 atomic % or more, and 13 atomic % or less.

In a case where the metal element M includes Cr, in the metal element M, Cr can be included in an amount of 1 atomic % or more or 5 atomic % or more, and 15 atomic % or less.

In the ferrite sintered magnet and the ferrite particles according to this embodiment, when an atomic ratio of the metal elements is expressed by Formula (1), c, a, r, b, f, and m in Formula (1) satisfy the following Expressions (2) to (8).

$$Ca_c A_a R_r Bi_b Fe_f M_m \tag{1}$$

$$0.15 \leq c < 0.5 \tag{2}$$

$$0.01 \leq a \leq 0.1 \tag{3}$$

$$0.45 < r \leq 0.80 \tag{4}$$

$$0.01 \leq b < 0.1 \tag{5}$$

$$9.35 < f < 11.90 \tag{6}$$

$$0.1 \leq m \leq 0.50 \tag{7}$$

$$c + a + r + b = 1 \tag{8}$$

In ferrite sintered magnet and ferrite particles according to another embodiment, when an atomic ratio of the metal elements is expressed by Formula (1), c, a, r, b, f, and in Formula (1) satisfy the following Expressions (2) to (8).

$$Ca_c A_a R_r Bi_b Fe_f M_m \tag{1}$$

$$0.2 \leq c < 0.5 \tag{2}$$

$$0.01 \leq a \leq 0.1 \tag{3}$$

$$0.45 < r \leq 0.75 \tag{4}$$

$$0.01 \leq b < 0.1 \tag{5}$$

$$9.35 < f < 11.90 \tag{6}$$

$$0.1 \leq m \leq 0.45 \tag{7}$$

$$c + a + r + b = 1 \tag{8}$$

In Formula (1), c may be 0.20 or more, 0.25 or more, or 0.30 or more. c may be 0.45 or less, or 0.40 or less.

In Formula (1), a may be 0.01 or more or 0.03 or more from the viewpoint that a ratio of a different phase is reduced, and Br, HcJ, and squareness are further improved. From the same viewpoint, a may be 0.08 or less, or 0.05 or less.

In Formula (1), r may be 0.50 or more or 0.55 or more from the viewpoint that Br is further improved and low-temperature demagnetization of a coercive force tends to be suppressed. From the viewpoint that a decrease in the coercive force tends to be suppressed, and sintering tends to be accomplished even though the temperature is not high, r may be less than 0.80, 0.75 or less, 0.70 or less, or 0.65 or less.

In Formula (1), b may be 0.015 or more or 0.020 or more from the viewpoint of lowering a calcination temperature and further improving squareness of the coercive force, or may be 0.08 or less, 0.06 or less, or 0.05 or less from the viewpoint that a ratio of a different phase is further reduced.

In Formula (1), f may be 9.50 or more or 9.70 or more from the viewpoint of enhancing magnetization and further reducing a different phase, or may be 11.50 or less or 11.25 or less from the viewpoint that Br, HcJ, and squareness are further improved.

m in Formula (1) may be 0.15 or more, 0.20 or more, or 0.25 or more from the viewpoint of enhancing the magnetization and the coercive force, and of further reducing a different phase. From the same viewpoint, m in Formula (1) may be 0.45 or less, or 0.40 or less.

From the viewpoint that HcJ is further improved, and the ratio of the different phase is further reduced, it is preferable that the ferrite sintered magnet and the ferrite particles according to this embodiment further satisfy the following Expressions (3-1), (5-1), (6-1), and (7-1).

$$0.03 \leq a \leq 0.05 \tag{3-1}$$

$$0.01 \leq b \leq 0.05 \tag{5-1}$$

$$9.35 < f \leq 11.25 \tag{6-1}$$

$$0.25 \leq m \leq 0.45 \tag{7-1}$$

The ferrite sintered magnet and the ferrite particles according to this embodiment may contain Si from the viewpoint of further improving HcJ. From the viewpoint of further improving HcJ, the amount of Si contained in the ferrite sintered magnet and the ferrite particles may be 0.01% by mass or more, 0.05% by mass or more, or 0.10% by mass or more in terms of $SiO_2$. From the same viewpoint, the amount of Si contained in the ferrite sintered magnet and the ferrite particles may be 0.70% by mass or less, 0.60% by mass or less, or 0.40% by mass or less in terms of $SiO_2$.

From the viewpoint of further improving HcJ, the ferrite sintered magnet and the ferrite particles according to this embodiment may contain Al. From the viewpoint of further improving HcJ, the amount of Al contained in the ferrite sintered magnet and the ferrite particles may be 0.01% by mass or more, 0.05% by mass or more, or 0.10% by mass or more in terms of $Al_2O_3$. From the same viewpoint, the amount of Al contained in the ferrite sintered magnet and the ferrite particles may be 0.70% by mass or less, 0.60% by mass or less, or 0.40% by mass or less in terms of $Al_2O_3$.

In the ferrite sintered magnet and the ferrite particles, unavoidable components derived from impurities contained in raw materials and a manufacturing facility may be contained in addition to the above-described components. Examples of the components include titanium (Ti), manganese (Mn), molybdenum (Mo), and vanadium (V). The components may be contained in the ferrite sintered magnet and the ferrite particles as each oxide, or a composite oxide. An accessary component may be segregated at a grain boundary of ferrite crystal grains in the ferrite sintered magnet to form a different phase.

A content ratio of the metal elements in the ferrite sintered magnet and the ferrite particles can be measured by a fluorescent X-ray analysis method.

The content of a metalloid element such as silicon (Si) in the ferrite sintered magnet and the ferrite particles can be measured by inductively coupled plasma emission spectroscopy (ICP emission spectroscopy).

Figure 1:
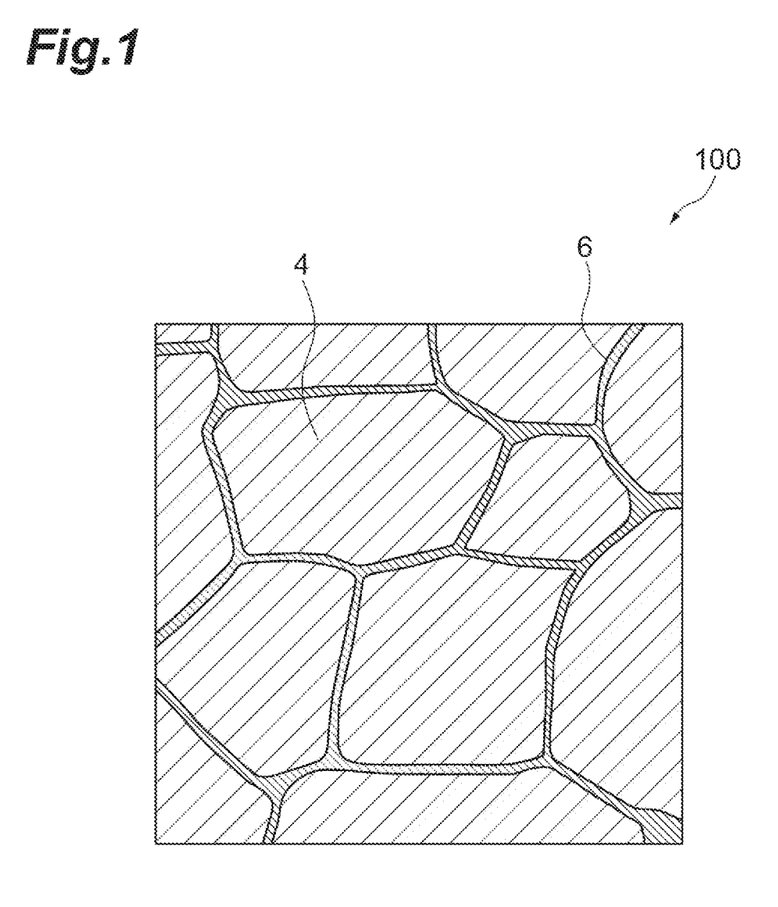
FIG. 1 is a schematic cross-sectional view of a ferrite sintered magnet or a ferrite particle according to an embodiment.

FIG. 1 is a schematic cross-sectional view of a ferrite sintered magnet (ferrite particles) 100 according to this embodiment. As illustrated in FIG. 1, the ferrite sintered magnet (ferrite particles) 100 according to this embodiment includes a ferrite phase (crystal grain) 4 having a magnetoplumbite-type (M-type) crystal structure, and a grain boundary phase 6 existing between a plurality of the ferrite phases (crystal grains) 4.

The M-type ferrite has a hexagonal crystal structure. Examples of the M-type ferrite include ferrite expressed by the following Formula (III).

$$AX_{12}O_{19} \tag{III}$$

A essentially includes Ca and La, and may include Sr and/or Ba. M may include R. X includes Fe, and may include Co.

Note that, actually, since a ratio of A (A-site) and X (B-site) in Formula (III), or a ratio of oxygen (O) shows a value that slightly deviates from the above-described range, the ratios may slightly deviate from the above-described numerical values.

From the viewpoint of sufficiently increasing magnetic properties, it is preferable that the ferrite sintered magnet and the ferrite particles according to this embodiment have the ferrite phase 4 as a main phase. Note that, in this specification, description of "as a main phase" in this embodiment represents a crystal phase of which a mass ratio is the greatest in the ferrite sintered magnet and the ferrite particles according to this embodiment. The ferrite sintered magnet and the ferrite particles according to this embodiment may have a crystal phase (different phase) different from the main phase. A ratio of the different phase may be 30% or less, 20% or less, 15% or less, 10% or less, or 5% or less on the basis of the ferrite phase (M phase).

examples of the different phase include an $Fe_2O_3$ phase and an $LaFeO_3$ phase. A ratio of the $Fe_2O_3$ phase is obtained as follows. An XRD pattern of the ferrite sintered magnet or the ferrite particles is measured, and then, the ratio is obtained as a value obtained by dividing a peak intensity (2θ: 33.21°) derived from a (104) plane of the $Fe_2O_3$ phase by a peak intensity (2θ: 32.35°) derived from a (107) plane of an M-type phase. A ratio of the $LaFeO_3$ phase is obtained as follows. An XRD pattern of the ferrite sintered magnet or the ferrite particles is measured, and then, the ratio is obtained as a value obtained by dividing a peak intensity (2θ: 22.67°) derived from a (101) plane of the $LaFeO_3$ phase by a peak intensity derived from the (107) plane of the M-type phase.

An average grain size of the ferrite phase (crystal grain) in the ferrite sintered magnet according to this embodiment may be, for example, 5 μm or less, 4.0 μm or less, or 0.5 to 3.0 μm. By having such an average grain size, a coercive force (HcJ) can be further increased. The average grain size of the ferrite phase (crystal grain) can be obtained by using a cross-section observation image by TEM or SEM. Specifically, after a cross-sectional area of each main phase grain on a cross-section of SEM or TEM which includes several hundred of ferrite phases (crystal grains) is obtained by image analysis, a diameter of a circle having the cross-sectional area (equivalent circle diameter) is defined as a grain size of the main phase grain on the cross-section, and a grain size distribution is measured. A number-basis average value of the grain size of the ferrite phase (crystal grain) is calculated from measured number-basis grain size distribution. The average value measured in this manner is set as the average grain size of the ferrite phase.

The grain boundary phase 6 contains an oxide as a main component. Specifically, examples of the oxide include oxides including at least one kind selected from the group consisting of Si, Ca, Sr, Ba, Fe, Mn, Co, Cr, Zn, and Al, and a composite oxide of two or more among the elements. Examples of the oxide include $SiO_2$, CaO, BaO, SrO, $Fe_2O_3$, $CO_3O_4$, ZnO, $Al_2O_3$, MnO, and $Cr_2O_3$. In addition, silicate glass may be contained. A mass ratio of the oxide can be 90% by mass or more, 95% by mass or more, or 97% by mass or more.

In the cross-section of the ferrite sintered magnet according to this embodiment, an area ratio of the grain boundary phase 6 in the sum of the ferrite phase 4 and the grain boundary phase 6 can be set to 0.1% to 5%.

A shape of the ferrite sintered magnet according to this embodiment is not particularly limited, and can be set to various shapes such as an arc segment (C-type) shape in which a cross-section is curved to be an arc and a flat plate shape.

For example, the ferrite particles can be obtained by a pulverization process to be described later. For example, an average particle size of the ferrite particles is 0.1 to 7 μm. An average particle size of the ferrite particles can also be obtained by using an observation image of the ferrite particles by TEM or SEM in a similar manner as in the average grain size of the crystal grain of the ferrite sintered magnet. Specifically, after an area of each main phase particle in SEM or TEM which includes several hundred of ferrite particles is obtained by image analysis, a diameter of a circle having the area (equivalent circle diameter) is defined as a particle size of the ferrite particles, and a particle size distribution is measured. A number-basis average value of the particle size of the ferrite particles is calculated from a measured number-basis particle size distribution. The average value measured in this manner is set as the average particle size of the ferrite particles.

Br of the ferrite sintered magnet and the ferrite particles according to this embodiment at 23° C. may be, for example, 4500 G or more, 4600 G or more, or 4700 G or more.

HcJ of the ferrite sintered magnet and the ferrite particles according to this embodiment at 23° C. may be, for example, 1800 Oe or more, 2000 Oe or more, or 2200 Oe or more.

Squareness of the ferrite sintered magnet and the ferrite particles according to this embodiment at 23° C. may be 80% or more, 82% or more, or 85% or more.

Br, HcJ, and squareness of the ferrite sintered magnet and the ferrite particles according to this embodiment can be measured by using a DC recording magnetic flux meter.

(Action and Effect)

The ferrite sintered magnet and the ferrite particles according to this embodiment contain Ca, the metal element A, the metal element R, Bi, Fe, and the metal element M in combination, essentially contains La, essentially contains Co, and the amounts thereof are set to ranges satisfying Expressions (2) to (8). According to this, Br and squareness become excellent.

In addition, the ferrite sintered magnet and the ferrite particles according to this embodiment contain Ca, the metal element A, the metal element R, Bi, Fe, and the metal element M in combination, essentially contains La, essentially contains Co, and the amounts thereof are set to ranges satisfying Expressions (2) to (8). According to this, there is a tendency that sintering can be performed a low temperature, HcJ is excellent, and a ratio of a different phase is reduced.

(Bonded Magnet)

Next, a bonded magnet according to this embodiment will be described.

The bonded magnet according to this embodiment includes the ferrite particles according to this embodiment, and a resin. Examples of the resin include: thermosetting resins such as an epoxy resin, a phenol resin, a resin having polyaromatic rings, and a resin having a triazine ring (triazine resin); and thermoplastic resins such as a styrene-based elastomer, an olefine-based elastomer, a urethane-based elastomer, a polyester-based elastomer, a polyamide-based elastomer such as nylon, an ionomer, an ethylene propylene copolymer (EPM), and an ethylene-ethyl acrylate copolymer.

For example, a content ratio of the resin in the bonded magnet according to this embodiment may be 0.5 to 10% by mass, or 1 to 5% by mass from the viewpoint of achieving both excellent magnetic properties and excellent shape retention. The content ratio of the resin in the bonded magnet can be adjusted by changing a resin concentration in a solution containing a resin that is used at the time of production, or a molding pressure at the time of producing a molded body. From the same viewpoint, for example, a content ratio of the ferrite particles in the bonded magnet may be 90 to 99.5% by mass, or 95 to 99% by mass.

A shape of the bonded magnet is not particularly limited, and can be set to a similar shape as in the ferrite sintered magnet.

The ferrite sintered magnet and the bonded magnet according to this embodiment can be used as a rotating electrical machine such as a motor and a generator, a magnet for a speaker and a headphone, a magnetron tube, a magnetic field generation device for MRI, a clamper for a CD-ROM, a sensor for a distributor, a sensor for ABS, a fuel and oil level sensor, a magnet latch, or a magnetic field generation member such as an isolator. In addition, the ferrite sintered magnet and the bonded magnet can also be used as a target (pellet) when forming a magnetic layer of a magnetic recording medium by a vapor deposition method, a sputtering method, or the like.

(Rotating Electrical Machine)

Figure 2:
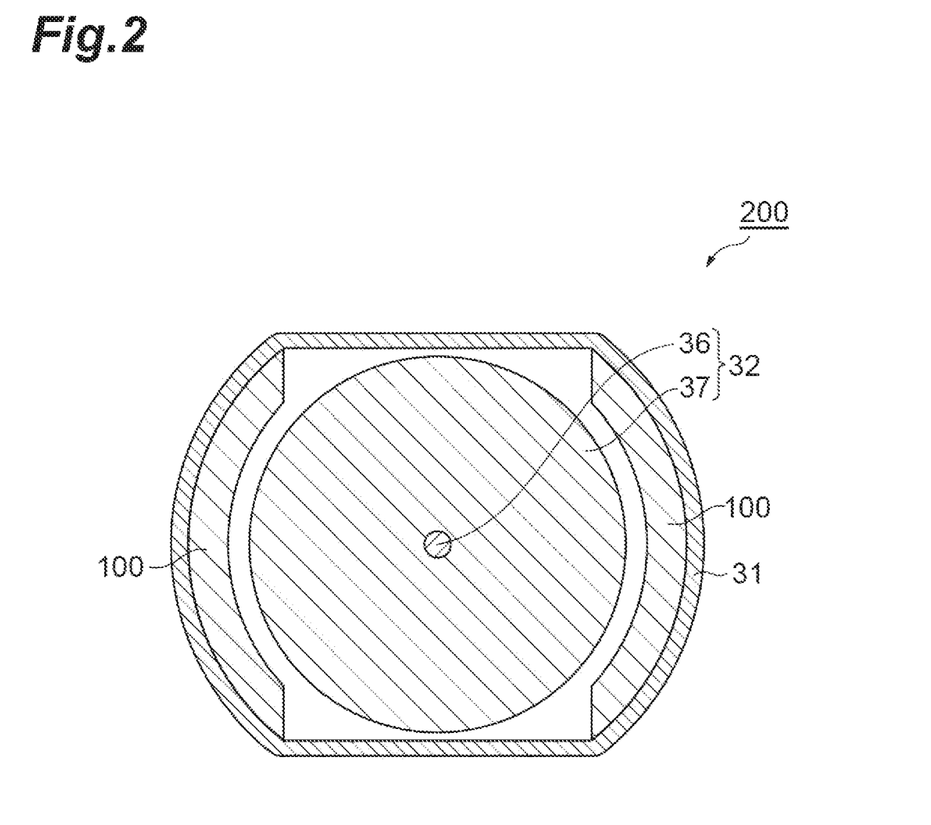
FIG. 2 is a schematic cross-sectional view of a motor according to an embodiment.

Next, a motor 200 according to this embodiment is illustrated in FIG. 2. The motor 200 includes a stator 31 and a rotor 32. The rotor 32 includes a shaft 36 and a rotor core 37. In the motor 200 of this embodiment, a C-shaped ferrite sintered magnet or bonded magnet 100 that is a permanent magnet is provided in the stator 31, and an electromagnet (coil) is provided in the rotor core 37 of the rotor 32.

Note that, with regard to a motor, the ferrite sintered magnet may be provided in the rotor, and the electromagnet (coil) may be provided in the stator. A shape of the motor is not particularly limited. In addition, other examples of the rotating electrical machine include a generator including the rotor and the stator. The ferrite sintered magnet can be provided in the rotor or the stator.

(Method of Manufacturing Ferrite Sintered Magnet and the like)

Next, description will be given of an example of a method of manufacturing the ferrite particles, the ferrite sintered magnet, and the bonded magnet. The manufacturing method to be described below includes a blending process, a calcination process, a pulverization process, a molding process, and a main sintering process. Details of each of the processes will be described below.

The blending process is a process of preparing a mixed powder for calcination. The mixed powder for calcination may contain a constituent element of ferrite, for example, Ca, the metal element A, the metal element R, Bi, Fe, and the metal element M. In the blending process, it is preferable that a mixture of powders containing respective elements is mixed by an attritor, a ball mill, or the like for approximately 1 to 20 hours, and a pulverization process is simultaneously performed to obtain a mixed powder.

An addition element such as Si may be contained in the powder in advance, or an additional powder containing the addition element may be further added in the blending process to obtain a mixed powder for calcination. Examples of the additional powder include an Si-containing powder.

Examples of a powder that contains each element include elementary substances, oxides, hydroxides, carbonates, nitrates, silicates, and organic metal compounds of each element. One powder may contain two or more metal elements, or one powder may contain substantially only one metal element.

Examples of a powder that contains Ca include $CaCO_3$ and CaO.

Examples of a powder that contains Sr include $SrCO_3$ and SrO.

Examples of a powder that contains R include $La_2O_3$ and $La(OH)_3$.

Examples of a powder that contains Bi include $Bi_2O_3$.

Examples of a powder that contains Fe include $Fe_2O_3$.

Examples of a powder that contains Co include $Co_3O_4$.

Examples of a powder that contains Zn include ZnO.

Examples of a powder that contains Al include $Al_2O_3$.

Examples of a powder that contains Si include $SiO_2$.

An average particle size of a raw material powder is not particularly limited, and is, for example, 0.1 to 2.0 μm.

After the blending process, it is preferable to dry a raw material composition and to remove coarse particles by a sieve as necessary.

In the calcination process, the raw material composition obtained in the blending process is calcined. For example, calcination is preferably performed in an oxidizing atmosphere such as the air. For example, a calcination temperature may be 1050° C. to 1350° C., 1200° C. to 1310° C., or 1220° C. to 1310° C. For example, a calcination time may be 1 minute to 10 hours, 1 minute to 5 hours, or 1 minute to 2 hours.

In the pulverization process, a calcined powder that has a granular shape, or a lump shape due to the calcination process is pulverized. In this manner, the ferrite particles are obtained. For example, the pulverization process may be performed in two stages including a process of pulverizing the calcinated powder to a coarse powder (coarse pulverization process), and a process of further finely pulverizing the resultant powder (fine pulverization process).

For example, the coarse pulverization can be performed until the average particle size of the pulverized powder becomes 0.1 to 5.0 μm by using a vibration mill or the like.

In the fine pulverization, a coarse powder obtained in the coarse pulverization is pulverized by a wet-type attritor, a ball mill, a jet mill, or the like. In the fine pulverization, pulverization is performed so that an average particle size of an obtained fine powder (ferrite particles) becomes, for example, approximately 0.08 to 2.0 μm. A specific surface area (obtained, for example, by a BET method) of the fine powder is set to, for example, 7 to 12 $m^2$/g. Preferable pulverization time is different in accordance with a pulverization method. For example, the pulverization time is 30 minutes to 10 hours in the case of the wet-type attritor, and is 10 to 50 hours in the case of the wet-type pulverization by the ball mill. A specific surface area of the ferrite particles can be measured by using a commercially available BET specific surface area measuring device (manufactured by Mountech Co., Ltd., product name: HM Model-1210).

In the fine pulverization process, in order to increase the degree of magnetic orientation of a sintered body that is obtained after main sintering, for example, polyvalent alcohol expressed by a general formula of $C_n(OH)_nH_{n+2}$ may be added. n in the general formula may be, for example, 4 to 100, or 4 to 30. Examples of the polyvalent alcohol include sorbitol. In addition, two or more kinds of polyvalent alcohols may be used in combination. In addition, in addition to the polyvalent alcohol, another known dispersant may be used in combination.

In the case of adding the polyvalent alcohol, an addition amount thereof may be, for example, 0.05 to 5.0% by mass, or 0.1 to 3.0% by mass with respect to an addition target (for example, the coarse powder). Note that, the polyvalent alcohol that is added in the fine pulverization process is thermally decomposed and removed in the main sintering process to be described later.

Note that, it is preferable to add a part of raw material powders, for example, a part of a $CaCO_3$ powder, and a part or the entirety of a $SiO_2$ powder, a part or the entirety of an $Al_2O_3$, and a part or the entirety of a $BaCO_3$ powder in the coarse pulverization process and/or the fine pulverization process without mixing all of the raw material powders in the blending process. When adding a powder including the components after the calcination, a sintering property in the main sintering process can be improved, and the magnetic properties can be improved. Note that, since the accessary components may flow out in combination with a solvent of slurry in the case of performing molding in a wet manner, the accessary components can be mixed in a content greater than a target content in 100% by mass of ferrite sintered magnet.

For example, in the case of adding a part of a Ca-containing powder after calcination, the addition amount of Ca may be 0.01% by mass or more, or 1.60% by mass or less in terms of $CaCO_3$ with respect to the entirety of the ferrite magnet.

In the molding process, the ferrite particles obtained in the pulverization process is molded in a magnetic field to obtain a molded body. Molding can be performed by either dry molding or wet molding method. From the viewpoint of increasing the degree of magnetic orientation, it is preferable to perform molding with the wet molding.

In the case of performing molding with the wet molding, for example, the above-described fine pulverization process is performed in a wet manner to obtain slurry, and the slurry is concentrated to a predetermined concentration to obtain slurry for wet molding. Molding can be performed by using the slurry for wet molding. The slurry can be concentrated by centrifugation, filter pressing, or the like. The content of the ferrite particles in the slurry for wet molding is, for example, 30 to 80% by mass. Examples of a dispersion medium for dispersing the ferrite particles in the slurry include water. A surfactant such as gluconic acid, gluconate, and sorbitol may be added to the slurry. As the dispersion medium, a non-aqueous solvent may be used. As the non-aqueous solvent, an organic solvent such as toluene and xylene can be used. In this case, a surfactant such as oleic acid may be added. Note that, the slurry for wet molding may be prepared by adding a dispersion medium or the like to the ferrite particles in a dry state after fine pulverization.

In the wet molding, molding in a magnetic field is subsequently performed with respect to the slurry for wet molding. In this case, for example, a molding pressure is 9.8 to 196 MPa (0.1 to 2.0 ton/cm$^2$). For example, a magnetic field that is applied is 398 to 1194 kA/m (5 to 15 kOe).

In the main sintering process, the molded body obtained in the molding process is sintered to obtain the ferrite sintered magnet. Sintering of the molded body can be performed in an oxidizing atmosphere such as the air. For example, a sintering temperature may be 1050° C. to 1350° C., 1200° C. to 1310° C., or 1200° C. to 1280° C. In addition, sintering time (for example, retention time at the sintering temperature) may be, for example, 0.5 to 3 hours, or 0.5 to 1 hour.

In the main sintering process, for example, heating may be performed at a temperature rising rate of approximately 0.5° C./minute from room temperature to approximately 100° C. before reaching a sintering temperature. According to this, the molded body can be sufficiently dried before sintering progresses. In addition, the surfactant added in the molding process can be sufficiently removed. Note that, the process may be performed at the beginning of the main sintering process, or may be performed separately before the main sintering process.

In this manner, the ferrite sintered magnet can be manufactured. In the case of manufacturing the bonded magnet instead of the ferrite sintered magnet, the molded body obtained in the above-described molding process is impregnated with a resin, and heating is performed to cure the resin, thereby obtaining the bonded magnet. Specifically, the molded body is immersed in a resin-containing solution that is prepared in advance, and is defoamed by reducing a pressure in a hermetically sealed container, thereby causing the resin-containing solution to permeate into voids of the molded body. Then, the molded body is taken out from the resin-containing solution, and an excess resin-containing solution adhered to a surface of the molded body is removed. A centrifugal separator or the like may be used to remove the excess resin-containing solution.

Before being immersed in the resin-containing solution, when the molded body is placed in a hermitically sealed container and is immersed in a solvent such as toluene while being maintained in a reduced pressure atmosphere, defoaming is promoted, and thus the impregnation amount of the resin can be increased, and voids in the molded body can be reduced.

The method of manufacturing the ferrite particles, the ferrite sintered magnet, and the bonded magnet is not limited to the above-described example. For example, in the case of manufacturing the bonded magnet, after performing processes up to the above-described pulverization process, the obtained ferrite particles and the resin may be mixed, and the resultant mixture may be molded in a magnetic field to obtain the bonded magnet containing the ferrite particles and the resin.

In addition, for example, the molding process and the main sintering process may be performed in the following order. That is, the molding process may be performed by a ceramic injection molding (CIM) molding method or powder injection molding (PIM, a kind of powder injection molding). In the CIM molding method, first, dried ferrite particles are heated and kneaded in combination with a binder resin to form a pellet. The pellet is injection-molded in a mold to which a magnetic field is applied to obtain a preliminary molded body. The preliminary molded body is subjected to a de-binder treatment to obtain a molded body. Next, in the main sintering process, for example, the molded body subjected to the de-binder treatment is sintered for approximately 0.2 to 3 hours in the air preferably at 1100° C. to 1280° C. and more preferably at a temperature of 1200° C. to 1280° C., thereby obtaining the ferrite sintered magnet.

EXAMPLES

The content of the present disclosure will be described in more detail with reference to examples and comparative examples, but the invention is not limited to the following examples.

[Manufacturing of Ferrite Sintered Magnet]

Examples 1 to 21, and Comparative Examples 1 to 21

As raw materials, powders of calcium carbonate ($CaCO_3$), lanthanum hydroxide ($La(OH)_3$), cobalt oxide ($Co_3O_4$), iron oxide ($Fe_2O_3$), barium carbonate ($BaCO_3$), strontium carbonate ($SrCO_3$), aluminum oxide ($Al_2O_3$), and bismuth oxide ($Bi_2O_3$) were prepared. The raw material powders were blended in an atomic ratio as shown in Tables 1 and 2. However, in the case of adding the aluminum oxide, the calcium carbonate, and the barium carbonate in the pulverization process as to be described later, the amounts were deducted in advance. Then, these raw material powders were mixed and pulverized by using a steel ball mill to obtain a slurry (blending process).

The slurry was dried to obtain a dried product. Next, coarse particles were removed from the dried product. Next, the dried product was calcined at a calcination temperature shown in Tables 1 and 2 in the air to obtain a calcined powder (calcination process). In the calcination, an electric furnace (a super burner) was used. The obtained calcined powder was coarsely pulverized with a small-sized rod vibration mill to obtain a coarse powder. Then, the coarse powder was finely pulverized by using a wet-type ball mill to obtain slurry (pulverization process).

The amount of moisture in the slurry obtained after the fine pulverization was adjusted by a centrifugal separator to obtain slurry for wet molding. The slurry for wet molding was molded in an applied magnetic field of 796 kA/m (10 kOe) by using a wet-type magnetic field molding machine to obtain a molded body (molding process). The molded body had columnar shape having dimensions of 30 mm (diameter)×15 mm (thickness), and had orientation in a thickness direction. The obtained molded body was dried at room temperature in the air. Then, the molded body was subjected to main sintering at a temperature shown in Tables 1 and 2 in the air (main sintering process). In the main sintering, an electric furnace (super burner) was used. In this manner, a columnar ferrite sintered magnet was obtained.

Examples 22 to 30

Ferrite sintered magnets were obtained in a similar manner as in Examples 1 to 21 and Comparative Examples 1 to 21 except that after adding a silicon oxide ($SiO_2$) powder, a calcium carbonate ($CaCO_3$) powder, an aluminum oxide ($Al_2O_3$) powder, a barium carbonate ($BaCO_3$) powder, and sorbitol to the coarse powder to be an amount shown in Table 3 with respect to the mass of the ferrite sintered magnet, the resultant mixture was finely pulverized by using a wet-type ball mill to obtain slurry.

Examples 31 to 52

Ferrite sintered magnets were obtained in a similar manner as in Example 1 except that the raw material powders were blended so that atomic ratios become atomic ratios shown in Table 4.

TABLE 1

| | Atomic ratio | | | | | | | | Calcination temperature (° C.) | Main sintering temperature (° C.) |
|---|---|---|---|---|---|---|---|---|---|---|
| | r | b | c | a | | f | m | | | |
| | La | Bi | Ca | Ba | Sr | Fe | Co | Al | | |
| Comparative Example 1 | 0.75 | 0 | 0.2 | 0.05 | 0 | 10.95 | 0.35 | 0 | 1310 | 1330 |
| Comparative Example 2 | 0.4 | 0.1 | 0.5 | 0 | 0 | 9.14 | 0.36 | 0 | 1310 | 1190 |
| Example 1 | 0.7 | 0.05 | 0.2 | 0.05 | 0 | 10.95 | 0.35 | 0 | 1260 | 1260 |
| Comparative Example 3 | 0.6 | 0.15 | 0.2 | 0.05 | 0 | 10.95 | 0.35 | 0 | 1310 | 1310 |
| Comparative Example 4 | 0.55 | 0.2 | 0.2 | 0.05 | 0 | 10.95 | 0.35 | 0 | 1310 | 1180 |
| Example 2 | 0.65 | 0.05 | 0.25 | 0.05 | 0 | 10.95 | 0.35 | 0 | 1240 | 1250 |
| Comparative Example 5 | 0.6 | 0.1 | 0.15 | 0.05 | 0 | 10.95 | 0.35 | 0 | 1220 | 1210 |
| Comparative Example 6 | 0.55 | 0.15 | 0.25 | 0.05 | 0 | 10.95 | 0.35 | 0 | 1240 | 1250 |
| Example 3 | 0.6 | 0.05 | 0.3 | 0.05 | 0 | 10.95 | 0.35 | 0 | 1220 | 1210 |
| Comparative Example 7 | 0.55 | 0.1 | 0.3 | 0.05 | 0 | 10.95 | 0.35 | 0 | 1310 | 1210 |
| Comparative Example 8 | 0.5 | 0.15 | 0.3 | 0.05 | 0 | 10.95 | 0.35 | 0 | 1280 | 1280 |
| Example 4 | 0.7 | 0.05 | 0.2 | 0.05 | 0 | 11.05 | 0.35 | 0 | 1240 | 1260 |
| Example 5 | 0.7 | 0.05 | 0.2 | 0.05 | 0 | 11.25 | 0.35 | 0 | 1260 | 1280 |
| Example 6 | 0.7 | 0.05 | 0.2 | 0.05 | 0 | 10.75 | 0.35 | 0 | 1260 | 1260 |
| Example 7 | 0.7 | 0.05 | 0.2 | 0.05 | 0 | 10.55 | 0.35 | 0 | 1260 | 1280 |
| Example 8 | 0.7 | 0.05 | 0.2 | 0.05 | 0 | 10.35 | 0.35 | 0 | 1260 | 1280 |
| Example 9 | 0.7 | 0.05 | 0.2 | 0.05 | 0 | 10.15 | 0.35 | 0 | 1260 | 1280 |
| Example 10 | 0.7 | 0.05 | 0.2 | 0.05 | 0 | 9.95 | 0.35 | 0 | 1240 | 1280 |
| Example 11 | 0.7 | 0.05 | 0.2 | 0.05 | 0 | 9.75 | 0.35 | 0 | 1240 | 1280 |
| Example 12 | 0.7 | 0.05 | 0.2 | 0.05 | 0 | 9.55 | 0.35 | 0 | 1240 | 1280 |
| Comparative Example 9 | 0.7 | 0.05 | 0.2 | 0.05 | 0 | 9.35 | 0.35 | 0 | 1240 | 1280 |
| Example 13 | 0.6 | 0.05 | 0.3 | 0 | 0.05 | 10.95 | 0.35 | 0 | 1220 | 1220 |
| Example 14 | 0.62 | 0.03 | 0.3 | 0 | 0.05 | 10.9 | 0.35 | 0 | 1220 | 1240 |
| Example 15 | 0.6 | 0.05 | 0.3 | 0 | 0.05 | 10.95 | 0.4 | 0 | 1220 | 1220 |
| Example 16 | 0.62 | 0.03 | 0.3 | 0 | 0.05 | 10.9 | 0.4 | 0 | 1220 | 1240 |
| Example 17 | 0.6 | 0.05 | 0.3 | 0 | 0.05 | 10.95 | 0.45 | 0 | 1220 | 1220 |
| Example 18 | 0.62 | 0.03 | 0.3 | 0 | 0.05 | 10.9 | 0.45 | 0 | 1220 | 1240 |
| Example 19 | 0.64 | 0.01 | 0.3 | 0.05 | 0 | 10.95 | 0.35 | 0 | 1260 | 1260 |
| Example 20 | 0.64 | 0.01 | 0.3 | 0.05 | 0 | 10.9 | 0.4 | 0 | 1240 | 1260 |
| Example 21 | 0.64 | 0.01 | 0.3 | 0.05 | 0 | 10.85 | 0.45 | 0 | 1260 | 1260 |
| Example 22 | 0.56 | 0.05 | 0.35 | 0.05 | 0 | 10.95 | 0.4 | 0 | 1280 | 1200 |
| Example 23 | 0.57 | 0.08 | 0.31 | 0.05 | 0 | 10.95 | 0.4 | 0 | 1280 | 1200 |
| Example 24 | 0.58 | 0.08 | 0.29 | 0.05 | 0 | 10.95 | 0.4 | 0.02 | 1280 | 1220 |
| Example 25 | 0.58 | 0.08 | 0.29 | 0.05 | 0 | 10.95 | 0.4 | 0.02 | 1280 | 1240 |
| Example 26 | 0.53 | 0.07 | 0.33 | 0.06 | 0 | 10.95 | 0.4 | 0 | 1280 | 1240 |
| Example 27 | 0.56 | 0.08 | 0.31 | 0.05 | 0 | 10.95 | 0.4 | 0 | 1280 | 1200 |
| Example 28 | 0.57 | 0.08 | 0.28 | 0.07 | 0 | 10.95 | 0.4 | 0 | 1280 | 1220 |
| Example 29 | 0.58 | 0.08 | 0.29 | 0.05 | 0 | 10.95 | 0.4 | 0.02 | 1280 | 1220 |
| Example 30 | 0.56 | 0.07 | 0.30 | 0.07 | 0 | 10.95 | 0.4 | 0 | 1280 | 1220 |

TABLE 2

| | Atomic ratio | | | | | | | | Calcination temperature (° C.) | Main sintering temperature (° C.) |
|---|---|---|---|---|---|---|---|---|---|---|
| | r | b | c | a | | f | m | | | |
| | La | Bi | Ca | Ba | Sr | Fe | Co | Al | | |
| Comparative Example 10 | 0.75 | 0.05 | 0.2 | 0 | 0 | 10.95 | 0.35 | 0 | 1280 | 1240 |
| Comparative Example 11 | 0.7 | 0.05 | 0.25 | 0 | 0 | 10.95 | 0.35 | 0 | 1280 | 1240 |
| Comparative Example 12 | 0.65 | 0.05 | 0.3 | 0 | 0 | 10.95 | 0.35 | 0 | 1280 | 1240 |
| Comparative Example 13 | 0.6 | 0.05 | 0.35 | 0 | 0 | 10.95 | 0.35 | 0 | 1280 | 1240 |
| Comparative Example 14 | 0.75 | 0.05 | 0.2 | 0 | 0 | 10.35 | 0.35 | 0 | 1280 | 1240 |
| Comparative Example 15 | 0.7 | 0.05 | 0.25 | 0 | 0 | 10.4 | 0.35 | 0 | 1280 | 1240 |

TABLE 2-continued

| | Atomic ratio | | | | | | | | Calcination temperature (° C.) | Main sintering temperature (° C.) |
|---|---|---|---|---|---|---|---|---|---|---|
| | r | b | c | a | | f | m | | | |
| | La | Bi | Ca | Ba | Sr | Fe | Co | Al | | |
| Comparative Example 16 | 0.65 | 0.05 | 0.3 | 0 | 0 | 10.45 | 0.35 | 0 | 1280 | 1240 |
| Comparative Example 17 | 0.6 | 0.05 | 0.35 | 0 | 0 | 10.5 | 0.35 | 0 | 1280 | 1240 |
| Comparative Example 18 | 0.75 | 0.05 | 0.2 | 0 | 0 | 10.35 | 0.4 | 0 | 1280 | 1240 |
| Comparative Example 19 | 0.7 | 0.05 | 0.25 | 0 | 0 | 10.4 | 0.4 | 0 | 1280 | 1240 |
| Comparative Example 20 | 0.65 | 0.05 | 0.3 | 0 | 0 | 10.45 | 0.4 | 0 | 1280 | 1260 |
| Comparative Example 21 | 0.6 | 0.05 | 0.35 | 0 | 0 | 10.5 | 0.4 | 0 | 1280 | 1240 |

TABLE 3

| | Amount contained in magnet % by mass) | | | | |
|---|---|---|---|---|---|
| | $SiO_2$ | Sorbitol | $Al_2O_3$ | $CaCO_3$ | $BaCO_3$ |
| Example 22 | 0.3 | 0 | 0 | 0.7 | 0 |
| Example 23 | 0.1 | 0 | 0 | 0.7 | 0 |
| Example 24 | 0 | 0 | 0.1 | 0.7 | 0.1 |
| Example 25 | 0 | 0 | 0.1 | 0.7 | 0 |
| Example 26 | 0.3 | 0.3 | 0 | 0.7 | 0 |
| Example 27 | 0.1 | 0.1 | 0 | 0.7 | 0 |
| Example 28 | 0 | 0.3 | 0 | 0.7 | 0.1 |
| Example 29 | 0 | 0.1 | 0.1 | 0.7 | 0 |
| Example 30 | 0.1 | 0.3 | 0 | 0.5 | 0 |

As measurement conditions, a characteristic X-ray was set to Cu-Kα ray, a sampling width was set to 2θ=10° to 70°, a scanning speed was set to 4.0°/minute, an X-ray tube voltage was set to 50 kilovolts, an X-ray tub e current was set to 300 mA, a diffusion slit was set to 1°, a vertical limit of the diffusion slit was set to 10 mm, and a light-receiving slit was set to 0.3 mm. From the obtained XRD pattern, a ratio of $Fe_2O_3$ phase and a ratio of $LaFeO_3$ phase when the M-type phase was set to 100% were calculated. The ratio of $Fe_2O_3$ phase was set to a value obtained by dividing a peak intensity (2θ: 33.21°) derived from a (104) plane of the $Fe_2O_3$ phase by a peak intensity (2θ: 32.35°) derived from the (107) plane of the M-type phase. The ratio of the ratio of $LaFeO_3$ phase was set to a value obtained by dividing a peak

TABLE 4

| | Atomic ratio | | | | | | | | | | | | Calcination temperature (° C.) | Main sintering temperature (° C.) |
|---|---|---|---|---|---|---|---|---|---|---|---|---|---|---|
| | r | b | c | a | | f | m | | | | | | | |
| | La | Bi | Ca | Ba | Sr | Fe | Co | Cr | Zn | Al | Cu | Ni | | |
| Example 31 | 0.6 | 0.05 | 0.3 | 0 | 0.05 | 10.9 | 0.3 | 0.05 | 0 | 0 | 0 | 0 | 1240 | 1230 |
| Example 32 | 0.6 | 0.05 | 0.3 | 0 | 0.05 | 10.9 | 0.35 | 0 | 0.05 | 0 | 0 | 0 | 1240 | 1240 |
| Example 33 | 0.6 | 0.05 | 0.3 | 0 | 0.05 | 10.9 | 0.4 | 0 | 0.05 | 0 | 0 | 0 | 1240 | 1220 |
| Example 34 | 0.6 | 0.05 | 0.3 | 0 | 0.05 | 10.9 | 0.35 | 0 | 0 | 0.05 | 0 | 0 | 1240 | 1220 |
| Example 35 | 0.6 | 0.05 | 0.3 | 0 | 0.05 | 10.9 | 0.35 | 0 | 0 | 0 | 0.05 | 0 | 1240 | 1200 |
| Example 36 | 0.6 | 0.05 | 0.3 | 0 | 0.05 | 10.9 | 0.35 | 0 | 0 | 0 | 0 | 0.05 | 1240 | 1220 |
| Example 37 | 0.6 | 0.05 | 0.3 | 0 | 0.05 | 10.9 | 0.35 | 0.05 | 0 | 0 | 0 | 0 | 1240 | 1220 |
| Example 38 | 0.6 | 0.05 | 0.3 | 0 | 0.05 | 10.9 | 0.35 | 0.05 | 0 | 0 | 0 | 0 | 1240 | 1230 |
| Example 39 | 0.6 | 0.05 | 0.3 | 0 | 0.05 | 10.9 | 0.35 | 0.05 | 0 | 0 | 0 | 0 | 1240 | 1240 |
| Example 40 | 0.6 | 0.05 | 0.3 | 0 | 0.05 | 10.9 | 0.35 | 0 | 0.05 | 0 | 0 | 0 | 1240 | 1200 |
| Example 41 | 0.6 | 0.05 | 0.3 | 0 | 0.05 | 10.9 | 0.35 | 0 | 0.05 | 0 | 0 | 0 | 1240 | 1220 |
| Example 42 | 0.6 | 0.05 | 0.3 | 0 | 0.05 | 10.9 | 0.35 | 0 | 0.05 | 0 | 0 | 0 | 1240 | 1230 |
| Example 43 | 0.6 | 0.05 | 0.3 | 0 | 0.05 | 10.85 | 0.4 | 0 | 0.05 | 0 | 0 | 0 | 1240 | 1200 |
| Example 44 | 0.6 | 0.05 | 0.3 | 0 | 0.05 | 10.85 | 0.4 | 0 | 0.05 | 0 | 0 | 0 | 1240 | 1220 |
| Example 45 | 0.6 | 0.05 | 0.3 | 0 | 0.05 | 10.85 | 0.4 | 0 | 0.05 | 0 | 0 | 0 | 1240 | 1230 |
| Example 46 | 0.6 | 0.05 | 0.3 | 0 | 0.05 | 10.89 | 0.35 | 0 | 0 | 0.01 | 0 | 0 | 1240 | 1220 |
| Example 47 | 0.79 | 0.01 | 0.15 | 0.05 | 0 | 10.95 | 0.35 | 0 | 0 | 0 | 0 | 0 | 1310 | 1280 |
| Example 48 | 0.65 | 0.04 | 0.3 | 0 | 0.01 | 10.9 | 0.4 | 0 | 0 | 0 | 0 | 0 | 1280 | 1240 |
| Example 49 | 0.65 | 0.05 | 0.27 | 0 | 0.03 | 10.9 | 0.4 | 0 | 0 | 0 | 0 | 0 | 1280 | 1240 |
| Example 50 | 0.59 | 0.01 | 0.3 | 0 | 0.1 | 11 | 0.4 | 0 | 0 | 0 | 0 | 0 | 1240 | 1220 |
| Example 51 | 0.59 | 0.01 | 0.3 | 0 | 0.1 | 11 | 0.4 | 0 | 0 | 0 | 0 | 0 | 1240 | 1240 |
| Example 52 | 0.59 | 0.01 | 0.3 | 0 | 0.1 | 11 | 0.4 | 0 | 0 | 0 | 0 | 0 | 1240 | 1260 |

[Evaluation of Ferrite Particles]

An XRD pattern of a coarse powder as the ferrite particles was measured. In the measurement, a powder X-ray diffraction device manufactured by Rigaku Corporation was used. intensity (2θ: 22.67°) derived from a (101) plane of the $LaFeO_3$ phase by the peak intensity derived from the (107) plane of the M-type phase. Results are shown in Tables 5 to 7.

[Evaluation of Ferrite Sintered Magnet]
<Evaluation of Magnetic Properties>

After processing upper and lower surfaces of each of the ferrite sintered magnets by a vertical polishing machine, Br, HcJ, Hk, and squareness (Hk/HcJ) at 23° C. were respectively measured by using a DC recording magnetic flux meter in a maximum applied magnetic field of 2389 kA/m. Results are shown in Tables 5 to 7.

<Composition Analysis>

The content of silicon (Si) in the ferrite sintered magnet was measured in the following order. 0.1 g of ferrite sintered magnet sample was mixed with 1 g of sodium peroxide and 1 g of sodium carbonate, and the resultant mixture was heated and melted. The melt was dissolved in a solution of pure water of 40 ml and hydrochloric acid of 10 ml, and pure water was added to the resultant solution to obtain a solution of 100 ml. The content of silicon in terms of $SiO_2$ was obtained by ICP emission spectroscopy (ICP-AES) by using the solution. In the ICP emission spectroscopy, an analysis device manufactured by SHIMADZU CORPORATION (device name: ICPS 8100CL) was used, and matrix matching was performed in measurement. a, b, c, r, f, and m in the ferrite sintered magnet were measured by fluorescent X-ray analysis. Results are shown in Tables 1, 2, and 4.

TABLE 5

| | Evaluation of magnetic properties | | | | Ratio of phase (%) | |
|---|---|---|---|---|---|---|
| | Br (G) | Hcj (Oe) | Hk (Oe) | Hk/HcJ (%) | $LaFeO_3$ | $Fe_2O_3$ |
| Comparative Example 1 | 4824 | 1897 | 1482 | 78 | 2 | 0 |
| Comparative Example 2 | 3565 | 72.59 | 28.36 | 39 | 4 | 7 |
| Example 1 | 4584 | 2559 | 2064 | 81 | 0 | 0 |
| Comparative Example 3 | 3711 | 193.1 | 57.59 | 30 | 0 | 4 |
| Comparative Example 4 | 3190 | 2458 | 1794 | 73 | 2 | 14 |
| Example 2 | 4729 | 2028 | 1836 | 91 | 0 | 0 |
| Comparative Example 5 | 4136 | 2927 | 2086 | 71 | 1 | 3 |
| Comparative Example 6 | 3753 | 2750 | 2242 | 82 | 2 | 9 |
| Example 3 | 4511 | 2618 | 2444 | 93 | 0 | 0 |
| Comparative Example 7 | 4282 | 2357 | 1285 | 55 | 0 | 3 |
| Comparative Example 8 | 4055 | 844.5 | 107.1 | 13 | 0 | 5 |
| Example 4 | 4620 | 2501 | 2184 | 87 | 0 | 0 |
| Example 5 | 4588 | 2092 | 1738 | 83 | 0 | 0 |
| Example 6 | 4591 | 2420 | 2059 | 85 | 0 | 0 |
| Example 7 | 4615 | 2326 | 2069 | 89 | 0 | 0 |
| Example 8 | 4617 | 2251 | 2007 | 89 | 0 | 0 |
| Example 9 | 4603 | 2406 | 2106 | 88 | 2 | 0 |
| Example 10 | 4585 | 2446 | 2140 | 87 | 2 | 0 |
| Example 11 | 4581 | 2366 | 2148 | 91 | 2 | 0 |
| Example 12 | 4529 | 2417 | 2189 | 91 | 3 | 0 |
| Comparative Example 9 | 4466 | 2463 | 2211 | 90 | 3 | 0 |
| Example 13 | 4609 | 2326 | 2150 | 92 | 0 | 0 |
| Example 14 | 4613 | 2485 | 2266 | 91 | 0 | 0 |
| Example 15 | 4644 | 2650 | 2345 | 88 | 0 | 0 |
| Example 16 | 4629 | 2444 | 2288 | 94 | 0 | 0 |
| Example 17 | 4608 | 2617 | 2487 | 95 | 0 | 0 |
| Example 18 | 4562 | 2576 | 2405 | 93 | 0 | 0 |
| Example 19 | 4646 | 2398 | 2145 | 89 | 1 | 0 |
| Example 20 | 4575 | 2445 | 2270 | 93 | 0 | 0 |
| Example 21 | 4644 | 2613 | 2411 | 92 | 1 | 0 |
| Example 22 | 4553 | 3708 | 3293 | 89 | 0 | 0 |
| Example 23 | 4505 | 3544 | 3158 | 89 | 2 | 0 |
| Example 24 | 4515 | 2649 | 2288 | 86 | 2 | 0 |
| Example 25 | 4514 | 2642 | 2280 | 86 | 2 | 0 |

TABLE 5-continued

| | Evaluation of magnetic properties | | | | Ratio of phase (%) | |
|---|---|---|---|---|---|---|
| | Br (G) | Hcj (Oe) | Hk (Oe) | Hk/HcJ (%) | $LaFeO_3$ | $Fe_2O_3$ |
| Example 26 | 4716 | 3013 | 2413 | 80 | 3 | 0 |
| Example 27 | 4556 | 3436 | 3091 | 90 | 3 | 0 |
| Example 28 | 4620 | 2529 | 2284 | 90 | 3 | 0 |
| Example 29 | 4555 | 2722 | 2424 | 89 | 3 | 0 |
| Example 30 | 4612 | 2787 | 2481 | 89 | 3 | 0 |

TABLE 6

| | Evaluation of magnetic properties | | | | Ratio of phase (%) | |
|---|---|---|---|---|---|---|
| | Br (G) | HcJ (Oe) | Hk (Oe) | Hk/HcJ (%) | $LaFeO_3$ | $Fe_2O_3$ |
| Example 31 | 4535 | 2357 | 2143 | 91 | 0 | 0 |
| Example 32 | 4661 | 2049 | 1921 | 94 | 1 | 0 |
| Example 33 | 4669 | 2171 | 1917 | 88 | 1 | 0 |
| Example 34 | 4509 | 2006 | 1741 | 87 | 1 | 0 |
| Example 35 | 4556 | 2401 | 2228 | 93 | 0 | 0 |
| Example 36 | 4543 | 2001 | 1835 | 92 | 0 | 0 |
| Example 37 | 4501 | 2655 | 2460 | 93 | 0 | 0 |
| Example 38 | 4535 | 2357 | 2143 | 91 | 0 | 0 |
| Example 39 | 4591 | 1874 | 1654 | 88 | 0 | 0 |
| Example 40 | 4502 | 2521 | 2414 | 96 | 1 | 1 |
| Example 41 | 4602 | 2186 | 2036 | 93 | 1 | 0 |
| Example 42 | 4661 | 2049 | 1921 | 94 | 1 | 0 |
| Example 43 | 4532 | 2803 | 2574 | 92 | 1 | 1 |
| Example 44 | 4669 | 2171 | 1917 | 88 | 1 | 0 |
| Example 45 | 4685 | 1908 | 1683 | 88 | 1 | 0 |
| Example 46 | 4530 | 2130 | 1874 | 88 | 0 | 0 |
| Example 47 | 4620 | 3275 | 2784 | 85 | 3 | 0 |
| Example 48 | 4593 | 2478 | 1982 | 80 | 2 | 0 |
| Example 49 | 4510 | 2302 | 2025 | 88 | 0 | 1 |
| Example 50 | 4557 | 3223 | 2979 | 92 | 1 | 1 |
| Example 51 | 4614 | 2845 | 2595 | 91 | 1 | 0 |
| Example 52 | 4662 | 2415 | 2297 | 95 | 0 | 0 |

TABLE 7

| | Evaluation of magnetic properties | | | | Ratio of phase (%) | |
|---|---|---|---|---|---|---|
| | Br (G) | HcJ (Oe) | Hk (Oe) | Hk/HcJ (%) | $LaFeO_3$ | $Fe_2O_3$ |
| Comparative Example 10 | 3940 | 2245 | 2100 | 94 | 2 | 6 |
| Comparative Example 11 | 4218 | 3258 | 2675 | 82 | 1 | 5 |
| Comparative Example 12 | 4419 | 3017 | 1922 | 64 | 2 | 3 |
| Comparative Example 13 | 4556 | 1584 | 665.3 | 42 | 2 | 2 |
| Comparative Example 14 | 4084 | 2382 | 2281 | 96 | 3 | 5 |
| Comparative Example 15 | 4394 | 3321 | 2529 | 76 | 3 | 4 |
| Comparative Example 16 | 4593 | 2478 | 1964 | 79 | 2 | 2 |
| Comparative Example 17 | 4572 | 1176 | 725.7 | 62 | 2 | 2 |
| Comparative Example 18 | 4454 | 2570 | 2219 | 86 | 3 | 5 |
| Comparative Example 19 | 4603 | 2703 | 2187 | 80 | 2 | 4 |

TABLE 7-continued

| | Evaluation of magnetic properties | | | | Ratio of phase (%) | |
|---|---|---|---|---|---|---|
| | Br (G) | HcJ (Oe) | Hk (Oe) | Hk/HcJ (%) | LaFeO$_3$ | Fe$_2$O$_3$ |
| Comparative Example 20 | 4620 | 1686 | 1314 | 78 | 3 | 3 |
| Comparative Example 21 | 4560 | 1014 | 795 | 78 | 3 | 2 |

REFERENCE SIGNS LIST

4: ferrite phase (main phase), 6: grain boundary phase, 31: stator (stator cover), 32: rotor, 36: shaft, 37: rotor core, 100: ferrite sintered magnet or bonded magnet, 200: motor.

What is claimed is:

1. A ferrite sintered magnet containing a ferrite phase having a magnetoplumbite-type crystal structure, containing:
    at least Ca, a metal element A, a metal element R, Bi, Fe, and a metal element M,
    wherein the metal element A is at least one kind of element selected from the group consisting of Sr, Ba, and Pb,
    the metal element R is at least one kind of element selected from the group consisting of rare-earth elements including Y and essentially includes La,
    the metal element M is at least one kind of element selected from the group consisting of Co, Ni, Zn, Al, Cu, and Cr, and essentially includes Co, and
    when an atomic ratio of the metal elements is expressed by Formula (1), c, a, r, b, f, and m in Formula (1) satisfy the following Expressions (2) to (8), $$Ca_c A_a R_r Bi_b Fe_f M_m \tag{1}$$

$$0.15 \leq c < 0.5 \tag{2}$$

$$0.01 \leq a \leq 0.1 \tag{3}$$

$$0.45 < r \leq 0.80 \tag{4}$$

$$0.01 \leq b < 0.1 \tag{5}$$

$$9.35 < f \leq 11.90 \tag{6}$$

$$0.1 \leq m \leq 0.50 \tag{7}$$

$$c + a + r + b = 1 \tag{8}$$

2. The ferrite sintered magnet according to claim 1, further satisfying the following Expressions (3-1), (5-1), (6-1), and (7-1), $$0.03 \leq a \leq 0.05 \tag{3-1}$$

$$0.01 \leq b \leq 0.05 \tag{5-1}$$

$$9.35 < f \leq 11.25 \tag{6-1}$$

$$0.25:5 \leq m \leq 0.45 \tag{7-1}$$

3. A rotating electrical machine comprising:
    the ferrite sintered magnet according to claim 1.

4. A rotating electrical machine comprising:
    the ferrite sintered magnet according to claim 2.

5. Ferrite particles containing a ferrite phase having a magnetoplumbite-type crystal structure, containing:
    at least Ca, a metal element A, a metal element R, Bi, Fe, and a metal element M,
    wherein the metal element A is at least one kind of element selected from the group consisting of Sr, Ba, and Pb,
    the metal element R is at least one kind of element selected from the group consisting of rare-earth elements including Y and essentially includes La,
    the metal element M is at least one kind of element selected from the group consisting of Co, Ni, Zn, Al, Cu, and Cr, and essentially includes Co, and
    when an atomic ratio of the metal elements is expressed by Formula (1), c, a, r, b, f, and m in Formula (1) satisfy the following Expressions (2) to (8), $$Ca_c A_a R_r Bi_b Fe_f M_m \tag{1}$$

$$0.15 \leq c < 0.5 \tag{2}$$

$$0.01 \leq a \leq 0.1 \tag{3}$$

$$0.45 < r \leq 0.80 \tag{4}$$

$$0.01 \leq b < 0.1 \tag{5}$$

$$9.35 < f \leq 11.90 \tag{6}$$

$$0.1 \leq m \leq 0.50 \tag{7}$$

$$c + a + r + b = 1 \tag{8}$$

6. A bonded magnet containing:
    the ferrite particles according to claim 5; and
    a resin.

7. A rotating electrical machine comprising:
    the bonded magnet according to claim 6.

* * * * *